(12) United States Patent
McClure et al.

(10) Patent No.: US 7,996,848 B1
(45) Date of Patent: Aug. 9, 2011

(54) SYSTEMS AND METHODS FOR SUSPENDING AND RESUMING THREADS

(75) Inventors: Steven T. McClure, Northboro, MA (US); Steven R. Chalmer, Auburndale, MA (US); Brett D. Niver, Grafton, MA (US)

(73) Assignee: EMC Corporation, Hopkinton, MA (US)

( * ) Notice: Subject to any disclaimer, the term of this patent is extended or adjusted under 35 U.S.C. 154(b) by 1270 days.

(21) Appl. No.: 11/324,989

(22) Filed: Jan. 3, 2006

(51) Int. Cl.
G06F 9/46 (2006.01)
G06F 7/00 (2006.01)
G06F 17/00 (2006.01)
G06F 13/00 (2006.01)
G06F 12/00 (2006.01)

(52) U.S. Cl. ........ 718/108; 707/620; 707/624; 707/704; 710/108; 710/200

(58) Field of Classification Search .................. 718/108; 709/210; 710/200
See application file for complete search history.

(56) References Cited

U.S. PATENT DOCUMENTS

| | | | | |
|---|---|---|---|---|
| 4,435,766 A * | 3/1984 | Haber et al. | ............ | 710/200 |
| 5,634,058 A * | 5/1997 | Allen et al. | ............ | 717/163 |
| 5,966,543 A * | 10/1999 | Hartner et al. | ............ | 710/200 |
| 6,622,189 B2 * | 9/2003 | Bryant et al. | ............ | 710/200 |
| 6,725,308 B2 * | 4/2004 | Joy et al. | ............ | 710/200 |
| 6,728,962 B1 * | 4/2004 | Chalmer et al. | ............ | 718/108 |
| 7,206,915 B2 * | 4/2007 | DeSouter et al. | ............ | 711/203 |
| 7,328,263 B1 * | 2/2008 | Sadjadi | ............ | 709/225 |
| 7,337,444 B2 * | 2/2008 | Browning et al. | ............ | 718/107 |
| 7,346,720 B2 * | 3/2008 | Fachan | ............ | 710/200 |
| 7,406,698 B2 * | 7/2008 | Richardson | ............ | 719/321 |
| 7,430,627 B2 * | 9/2008 | McKenney | ............ | 710/200 |
| 7,539,678 B2 * | 5/2009 | Demsey et al. | ............ | 1/1 |
| 7,721,291 B2 * | 5/2010 | McKenney | ............ | 718/104 |
| 2003/0070021 A1 * | 4/2003 | Joy et al. | ............ | 710/200 |
| 2004/0059759 A1 * | 3/2004 | Doan et al. | ............ | 707/205 |

(Continued)

OTHER PUBLICATIONS

Andrew D. Birrell, "An Introduction to Programming with Threads", Digital Equipment Corp., Jan. 6, 1989.

(Continued)

Primary Examiner — Van H Nguyen
Assistant Examiner — Adam Lee
(74) Attorney, Agent, or Firm — Muirhead and Saturnelli, LLC

(57) ABSTRACT

In a methods and systems of controlling a process's access to a device driver, a lock may be used to establish a process wait state or to wake up one or more processes. A spinlock may be used to acquire a lock associated with a device driver. The lock includes a lock value representing the availability of the lock. If the lock value is a first value, the process acquires the lock and sets the lock value to a second value. Otherwise, the process returns to the step of using the spinlock to acquire the lock associated with the device driver. If the lock is acquired, the process accesses the device driver. If the device is not ready, the process is set to wait for the lock. Waiting for the lock comprises setting a field of the process to a pointer to the lock and setting a state of the process to waiting. After the device has been successfully accessed or the process has been set to wait for the lock, the lock is released typically by setting the lock value to the first value.

15 Claims, 6 Drawing Sheets

U.S. PATENT DOCUMENTS

| | | | |
|---|---|---|---|
| 2005/0081204 A1* | 4/2005 | Schopp | 718/100 |
| 2006/0048149 A1* | 3/2006 | Clift | 718/100 |
| 2006/0156305 A1* | 7/2006 | Delapedraja | 718/102 |
| 2006/0259907 A1* | 11/2006 | Bhatia et al. | 718/104 |
| 2007/0094669 A1* | 4/2007 | Rector et al. | 718/104 |
| 2008/0256547 A1* | 10/2008 | Brahmavar | 718/104 |

OTHER PUBLICATIONS

"POSIX Threads Programming"; [online] [Retrieved Dec. 28, 2005] Retrieved from the Internet http://www.llnl.gov/computing/tutorials/pthreads/.

U.S. Appl. No. 11/239,776, filed Sep. 30, 2005, McClure et al.

* cited by examiner

SYSTEMS AND METHODS FOR SUSPENDING AND RESUMING THREADS

BACKGROUND

1. Technical Field

The present invention generally relates to multithreaded programming.

2. Related Art

Threads are used by software developers to enable concurrent execution of sequences of instructions. One way that software developers have managed access to devices in multithreaded programming is through the use of wait states and wake up calls. When a process needs to access a device whose state is busy, the process state will be set to the wait for x where x is a value associated with the unavailable device driver. When the device is ready for the next process, it issues an interrupt that invokes a wake up function. The resulting wake up call will change the state of all processes that are waiting for the relevant device driver. For example, the wake up x call will change the state of all processes that are in the state of waiting for the device driver associated with x to an executable state. The scheduler takes note of all processes in the executable state and will select the next process to be executed.

A problem with the foregoing management technique is possibility of a missed wake up call. A wake up call can be missed in the following scenario. A first process P1 accesses the device driver and begins using the device. Then, a second process P2 accesses the device driver, finds the device is not ready, the state of process P2 is then set to wait for the variable associated with the device driver. The problem occurs when the device becomes ready after P2 has found that the device is busy but before the state of P2 has been set to wait for the variable associated with the device driver. It is possible during this critical period that the device will become ready and an interrupt will invoke a wake up function to wake up processes waiting for the variable associated with the device driver. A wake up call issued in this critical period will not change the state of P2 because the state of P2 has not yet been set to wait for the variable associated with the device driver. Accordingly, the wake up call is not effective for P2 and P2 remains blocked.

A workaround that has been used for multithreaded programming in a single processor environment is to turn off interrupts before accessing a device driver. Since wake up calls are issued by interrupts, turning off interrupts prevents wake up calls from being issued. Therefore, turning off interrupts before accessing a device driver prevents a process from missing a wake up call because its process state has not yet been set to wait for the variable associated with the device driver. Of course, interrupts are later turned back on.

There are problems with using interrupts as discussed above. For instance, turning off the interrupts decreases the performance of the relevant system. In a multiprocessing environment, turning off the interrupts does not avoid the possibility of a race condition. Turning off the interrupts for a plurality of processors in a multiprocessing environment is likely to cause an unacceptable decrease in the performance of the system.

SUMMARY OF EXEMPLARY EMBODIMENTS

Methods and systems are disclosed that use a lock to establish a process wait state or to wake up one or more processes. One embodiment consistent with principles of the invention is a method of controlling a process's access to a device driver. The method includes using a spinlock to acquire a lock associated with a device driver. The lock comprises a lock value representing the availability of the lock. If the lock value is a first value, the process acquires the lock and sets the lock value to a second value. Otherwise, the process returns to the step of using the spinlock to acquire the lock associated with the device driver. If the lock is acquired, the process accesses the device driver. If the device is not ready, the process is set to wait for the lock. Waiting for the lock comprises setting a field of the process to a pointer to the lock and setting a state of the process to waiting. After the device has been successfully accessed or the process has been set to wait for the lock, the lock is released typically by setting the lock value to the first value.

Another embodiment consistent with principles of the invention is a method of enabling access to a device driver when the device is ready. The method includes identifying a lock associated with a device driver and checking the lock count, wherein the lock comprises a lock count representing a number of processes waiting for the lock. If the lock count is greater than zero, the method further comprises checking a process table for a process including a pointer to the lock structure; setting a state of the process to executable; and returning to the step of checking the lock count.

Another embodiment consistent with principles of the invention is a multithreaded processing system that features memory and at least one processor configured to perform one or more of the foregoing methods. Another aspect of the invention is a computer-readable medium comprising instructions to configure a computer to execute one or more of the foregoing methods.

Additional embodiments consistent with principles of the invention are set forth in the detailed description which follows or may be learned by practice of methods or use of systems or articles of manufacture disclosed herein. It is understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DETAILED DESCRIPTION

Reference is now made in detail to exemplary embodiments of the invention, examples of which are illustrated in the accompanying drawings.

Methods and systems consistent with principles of the present invention are disclosed herein that use a lock to establish a process wait state or to wake up one or more processes. Generally, the lock includes a variable whose value is used in a spinlock to determine whether the lock may be acquired and, by extension, whether a resource is accessible. The invention is based at least in part on the recognition that a spinlock is an atomic operation that can be used in conjunction with a lock structure to ensure exclusive access, even in a symmetric multiprocessing (SMP) environment. A process may be set to wait for the lock when a resource is accessible but not ready. Embodiments of the invention use the combination of a spinlock and a lock structure to prevent processes relating to a device from executing concurrently thereby avoiding missed wakeup calls. The lock may comprise a lock structure that includes a count used to identify a number of processes waiting for the lock structure.

Figure 1:
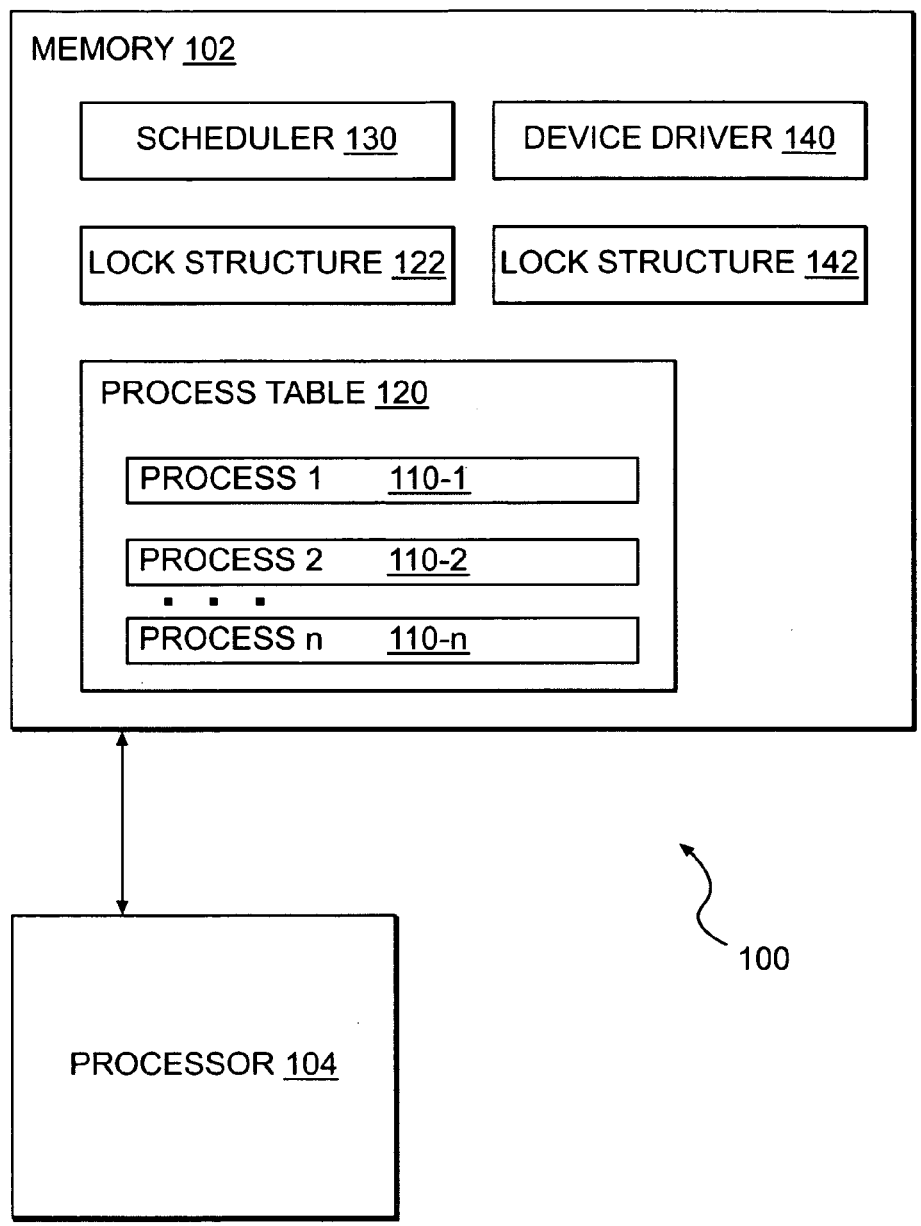
FIG. 1 illustrates an exemplary multithreaded processing system, consistent with features and principles of the present invention.

FIG. 1 illustrates an exemplary multithreaded processing system 100 consistent with features and principles of the present invention. System 100 may implement one or more methods consistent with features and principles of the present invention. System 100 includes memory 102 coupled to processor 104. Memory 102 may include on-board memory, cache memory, random access memory, flash memory, virtual memory, programmable read-only memory, or any other device for storing data. Processor 104 may include a mainframe, a laptop, a personal computer, a workstation, a computer chip, a digital signal processor board, an analog computer, and/or any other information processing device or combination of devices. Further, processor 104 may be implemented by a general purpose computer or data processor selectively activated or reconfigured by a stored computer program, or may be a specially constructed computing platform for implementing the features and operations disclosed herein.

System 100 is configured to run an operating system that supports threads and uses processor 104 as a resource that can execute a plurality of processes 110-1, 110-2, 110-n. Memory 102 includes a software task called a "scheduler." Scheduler 130 is executed by and performs scheduling for processor 104. Scheduler 130 has access to process table 120 and lock 122 residing in memory 102. In embodiments that are implemented with the C programming language, lock 122 may be a lock structure that is associated with process table 120. Process table 120 includes information for the plurality of processes 110 (110-1, 110-2, . . . , 110-n) in system 100. Specifically, process table 120 includes an array of sets of information about the state of the system such that each set may be preserved over a period of time. When any set is used to restore the system to its specific state, the thread of instructions that then execute consequential to that restoration will behave as if there had been no time elapsed between the preservation of that state and its subsequent restoration. Only those system states not preserved in and restored from process table 120 are able to influence the resumed thread of execution. Scheduler 130 determines which of the plurality of processes 110 in the process table 120 are to be executed next by processor 104. Finally, memory 102 includes device driver 140 and associated lock structure 142.

Figure 2:
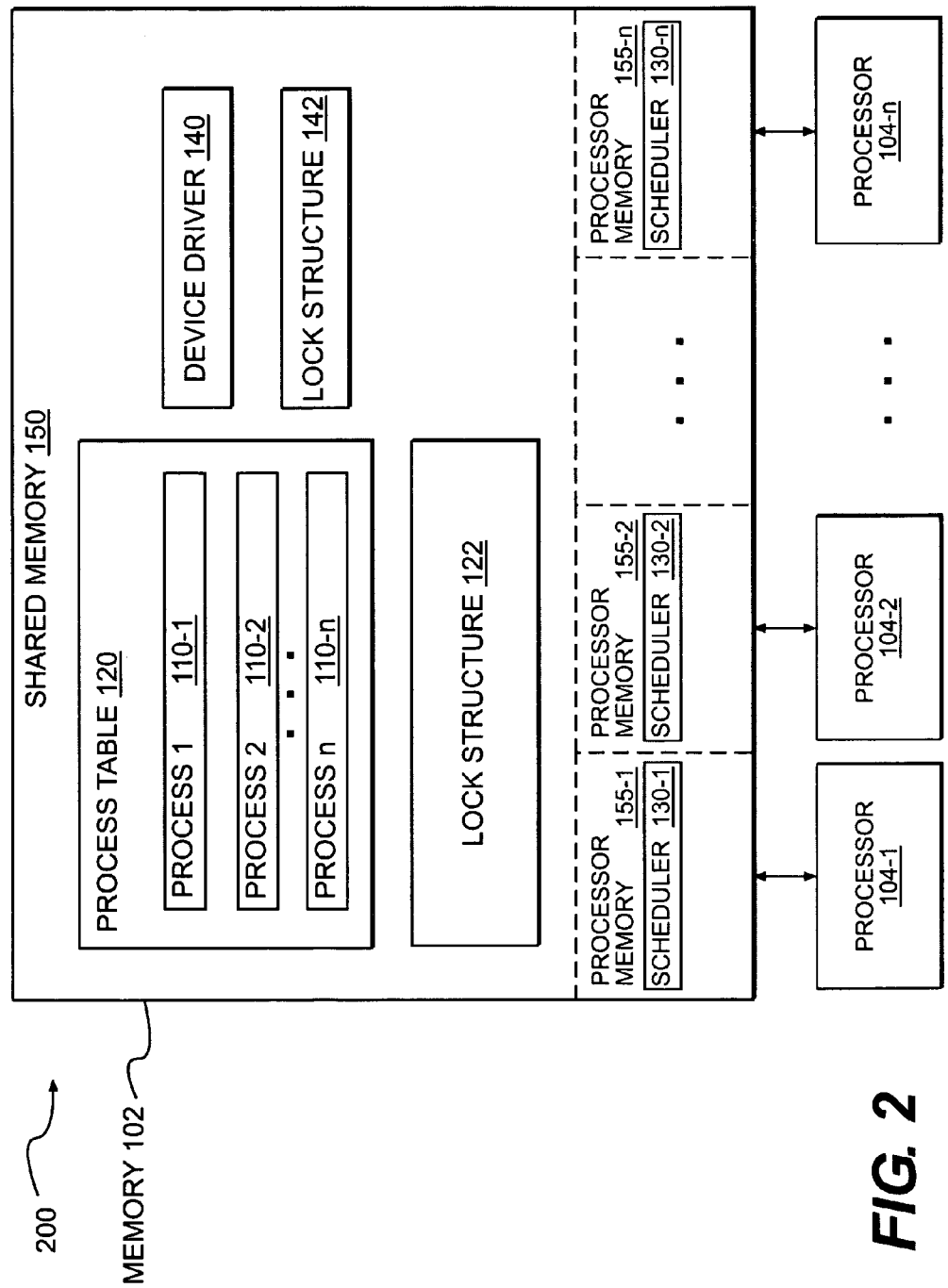
FIG. 2 illustrates an exemplary symmetric multiprocessing system, consistent with features and principles of the present invention.

Consistent with features and principles of the present invention, FIG. 2 illustrates an exemplary multiprocessing system 200. System 200 may also implement one or more methods consistent with features and principles of the present invention. System 200 includes a plurality of processors 104-1, 104-2, . . . , 104-n coupled to memory 102. Memory 102 may be implemented in a variety of ways. It may be convenient, for example, to use a single physical memory structure with logical (e.g., address-based) partitions to define shared memory 150 and private memories 155-1, 155-2, . . . , 155-n as respective memory regions. Alternatively, it may be desirable to use separate physical memory structures for each for the private memories 155-1, 155-2, . . . , 155-n as well as the shared memory 150.

Processors 104-1, 104-2, . . . , 104-n may be configured according to an asymmetric multiprocessing architecture, an SMP architecture, or any other computer architecture. Generally, an SMP system uses individual processors 104 as resources that can be assigned to execute processes defined for the system. In other words, there is one operating system for the entire SMP system, and one set of processes that are to be executed on that system. Theoretically, at any given time, any process might execute on any of the processors. In reality, there may be mechanisms that restrict which processes can be executed on which processors. Nonetheless, SMP in the most general sense involves treating processors as a pool or resources that can be assigned as necessary to execute the active processes in the system.

System 200 uses processors 104-1, 104-2, . . . , 104-n as resources that can execute a plurality of processes 110-1, 110-2, 110-n. Memory 102 includes a scheduler 130 in the individual memory 155 associated with each processor 104. For example, scheduler 130-1 in memory 155-1 is executed by and performs scheduling for associated processor 104-1. Scheduler 130-1, like other schedulers in individual memory 155, has access to process table 120 and lock structure 122 residing in shared memory 150. Lock structure 122 is associated with process table 120

Process table 120 includes execution information 112 (112-1, 112-2, . . . , 112-n where n is the number of active processes) for each active process 110 (110-1, 110-2, . . . , 110-n) in system 200. Execution information 112 may include, for example, a state for each active process. The set of possible process states is generally a function of the type of operating system and the processor architecture. In one embodiment particularly suitable for embedded systems, the PowerPC® processor architecture may be employed. For purposes of the present description, three potential process states are of interest: (1) executing; (2) executable; and (3) waiting. The executing state exists, for example, when a process 110 is currently executing on a processor 104. The executable state exists, for example, when a process 110 is ready to be executed, but has not yet been selected by scheduler 130 for execution by processor 104. The waiting state exists, for example, when a process 110 is not ready to be executed.

A process 110 may be in the waiting state, for example, when it must wait for something to occur before it may be executed. Process table 120, in some embodiments, includes an indication of the operation that must be completed before a process in the waiting state may be executed. This indication may be, for example, a variable or a pointer. Process table 120 may include a pointer to a lock structure that must be acquired in a field associated with a process 110 in the waiting state.

Using a scheduling algorithm, scheduler 130 selects the next executable process 110 in process table 120 for execution on processor 104. Various scheduling algorithms known in the art can be used. In the foregoing exemplary embodiment, symmetric distributed scheduling is used. Each processor in such systems may independently assign processing tasks to itself. Distributed scheduling may be particularly valuable in an SMP environment consistent with features and principles of the invention. Asymmetric scheduling is another option for use in multiprocessing systems consistent with features and principles of the invention.

Figure 3:
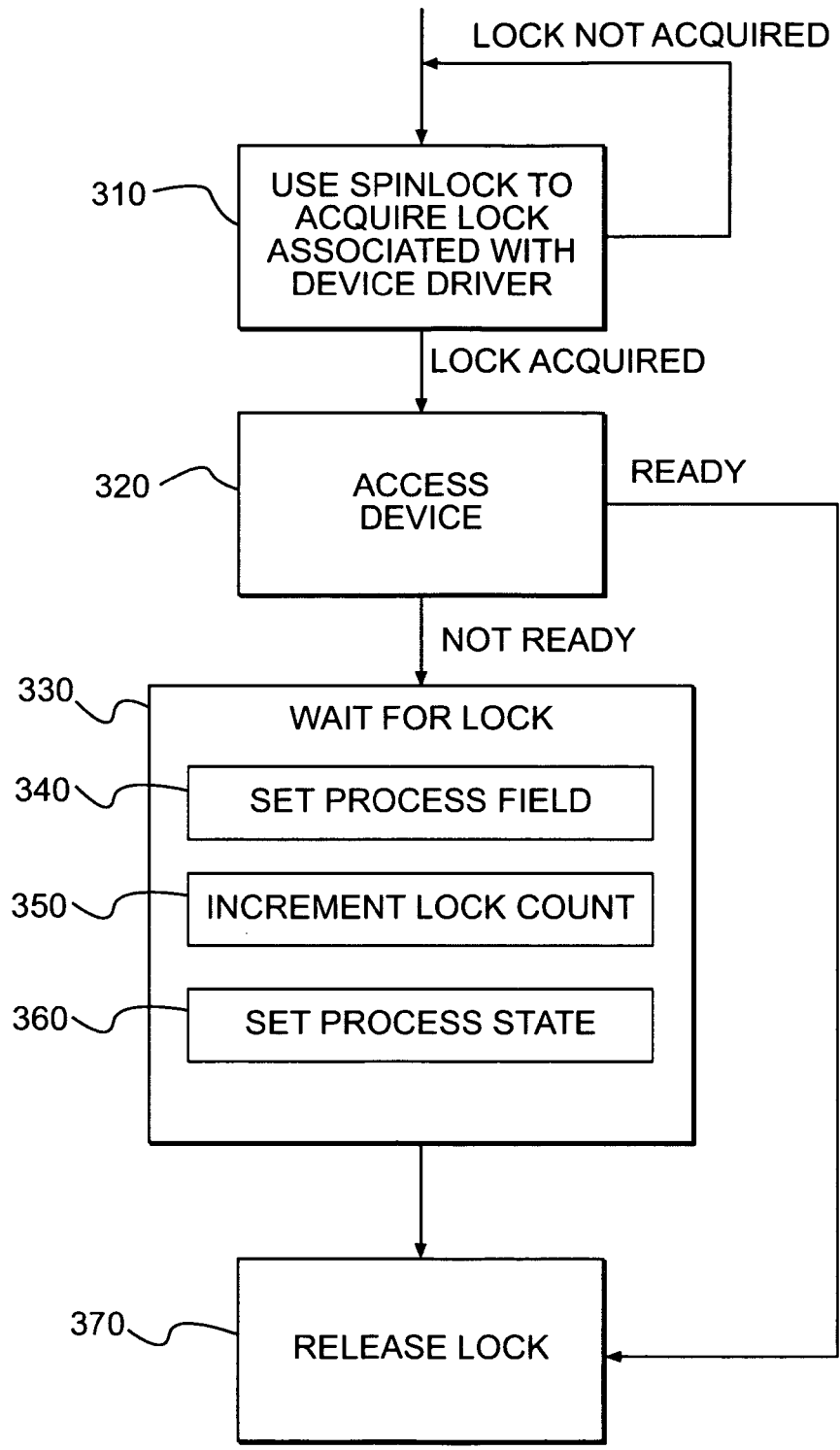
FIG. 3 illustrates an exemplary method for controlling access to a device driver, consistent with features and principles of the present invention.

FIG. 3 illustrates an exemplary method for controlling access to a device driver having an associated device such as a printer, disk drive, communications network, etc. The method of FIG. 3 may be implemented by system 100 or system 200, for example, when a process 110 to be executed needs to access device driver 140. In stage 310, a spinlock is used to acquire lock structure 142 associated with device driver 140. The spinlock is an atomic "test and set" operation. The use of an atomic operation to acquire the lock structure associated with the device driver ensures exclusive access to the device driver. Lock structure 142 comprises a lock value representing the availability of the lock structure. If the lock value is a first value, the lock structure is acquired, the lock value is set to another value, and the process proceeds to stage 320. Otherwise, process 110 returns to stage 310 to again try to acquire lock structure 142. The race condition is avoided by requiring any process seeking to access device driver 140 to use the same method.

In stage 320, process 110 accesses device driver 140. In this stage, process 110 may use the device as needed. However, if the device is blocked or otherwise not ready in stage 320, process 110 proceeds to stage 330.

In stage 330, process 110 is set to wait for lock structure 142. Stage 330 may itself include a plurality of stages. Some of the plurality of stages may comprise the modification of relevant execution information 112 in process table 120. For example, stage 330 generally includes stages 340 and 360. In stage 340, a field of the process 110 is set to a pointer to lock structure 142. In stage 360, a process state is set to waiting. The field indicates what the process is waiting for. In some embodiments of the invention, lock structure 142 can include a lock count used to represent the number of processes waiting for lock structure 142. If so, setting process 110 to wait for lock structure 142 further includes stage 350 in which the lock count is incremented.

After stage 330 is complete or successfully accessing the device in stage 320, process 110 proceeds to stage 370. In stage 370, the lock is released. This is typically accomplished by resetting the lock value in lock structure 142 to the first value and thereby indicating that lock structure 142 is available.

Figure 4:
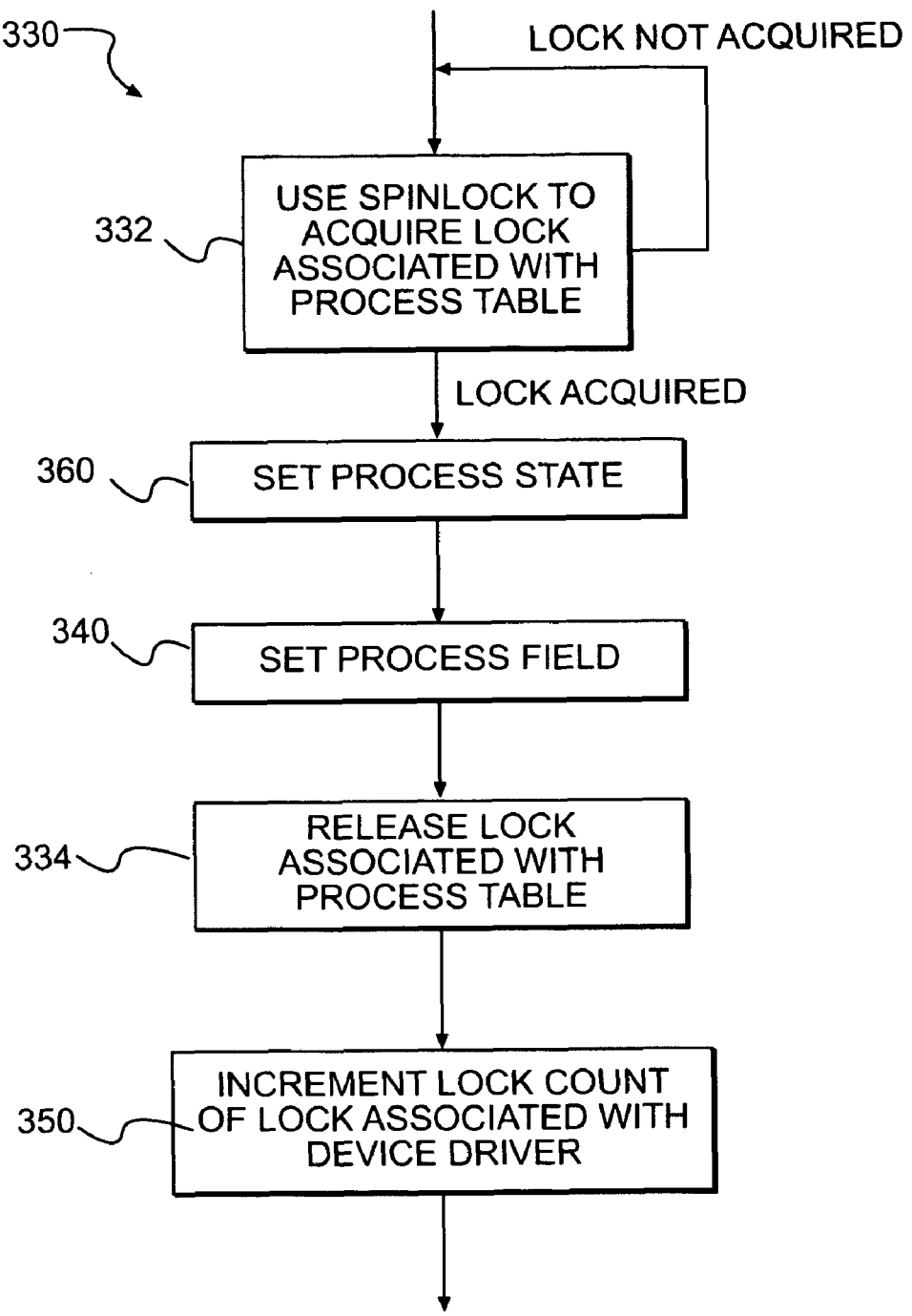
FIG. 4 illustrates an alternative stage of the exemplary method for controlling access to a device driver, consistent with features and principles of the present invention.

In the foregoing exemplary embodiments, the combination of a spinlock and a lock is used to ensure exclusive access to the contents of hardware registers (e.g., general purpose registers, R0-R4 registers, etc.), values of flags, program counters, machine state information, etc. Accordingly, the method of FIG. 3 may require process 110 to acquire lock structure 122 associated with process table 120 prior to modifying any execution information in process table 120 as in stages 340 and 360. FIG. 4 illustrates an alternative stage 330 in the exemplary method of FIG. 3.

In particular, FIG. 4 illustrates an alternative stage in which the combination of a spinlock and a lock value are used to ensure exclusive access to process table 120. In stage 332 of FIG. 4, similar to stage 310 of FIG. 3, a spinlock is used to acquire lock structure 122 associated with process table 120. The spinlock is an atomic "test and set" operation. The use of an atomic operation to acquire the lock structure associated with the process table ensures exclusive access to the process table. Lock structure 122 includes a lock value representing the availability of the lock structure. If the lock value is a first value, the lock structure is acquired, the lock value is set to another value, and process 110 proceeds to substage 360. Otherwise, process 110 returns to stage 332 to again try to acquire lock structure 122.

In stages 360 and 340 respectively of FIG. 4, similar to FIG. 3, a state of process 110 is set to waiting and a field of the process 110 is set to a pointer to lock structure 142. In stage 334 of FIG. 4, lock structure 122 associated with process table 120 is released. Because lock structure 122 protects process table 120, the lock structure must be released after all modifications to process table 120 are done. In stage 350, lock structure 122 associated with process table 120 is released. If lock structure 142 includes a lock count used to represent the number of processes waiting for device driver 140, the lock count is incremented in stage 350 of FIG. 4.

Figure 5:
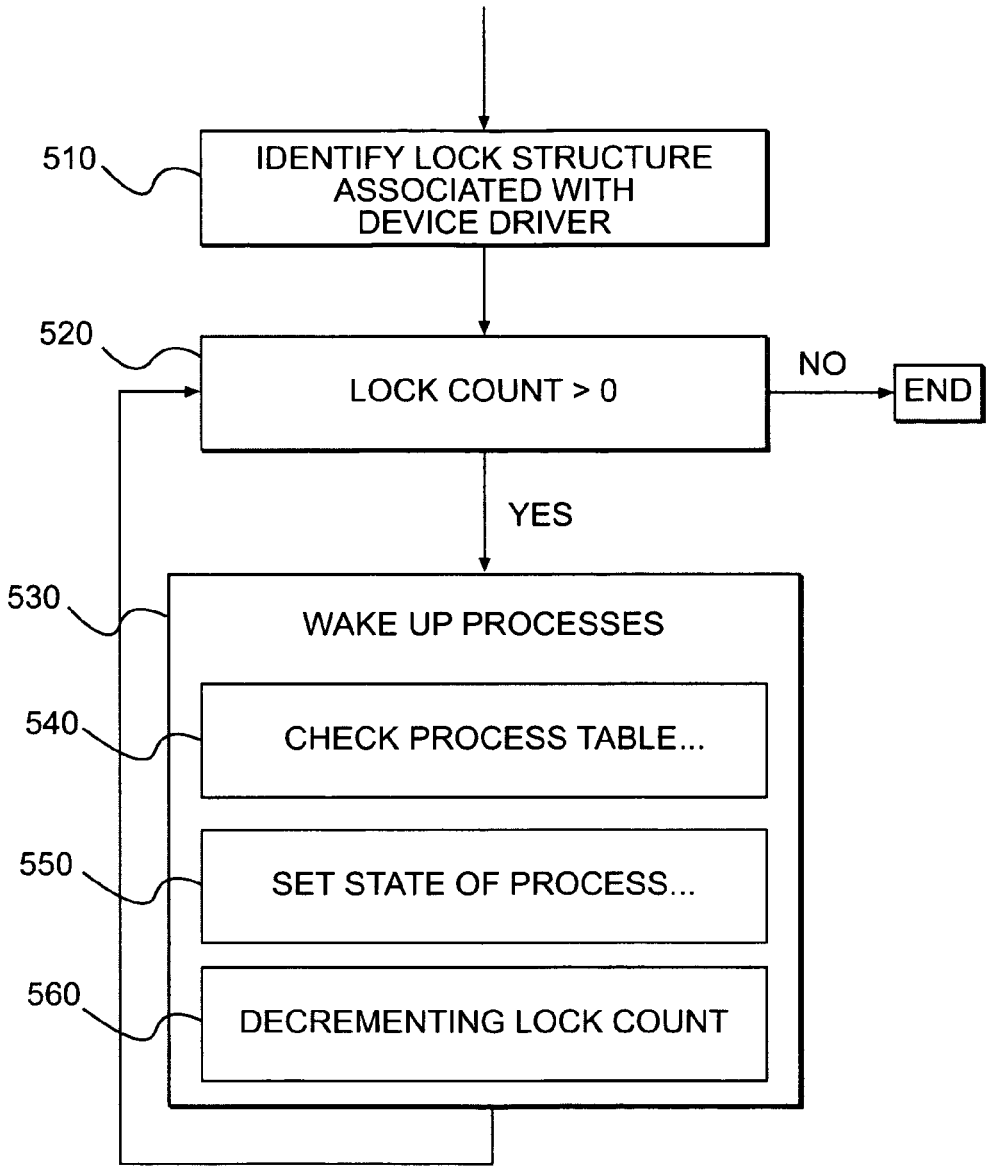
FIG. 5 illustrates an exemplary method for enabling access to a device driver when the device is ready, consistent with features and principles of the present invention.

FIG. 5 illustrates an exemplary method for enabling access to a device driver when the device is ready, consistent with features and principles of the present invention. The method of FIG. 5 may be implemented by system 100 or system 200, for example, when a device becomes ready. The method of FIG. 5 may typically be initiated when a device associated with device driver 142 becomes ready and an interrupt handler invokes a wake up function for processes waiting for lock structure 142. In stage 510, the system, typically the interrupt handler, identifies lock structure 142 associated with device driver 142.

In stage 520, the system checks the lock count in lock structure 142. The lock count represents the number of processes waiting for lock structure 142 associated with device driver 140. If the lock count is not greater than zero, the wake up function is complete. Otherwise, the system proceeds to stage 530.

In stage 530, the system tries to wakes up one or more processes that are waiting for lock structure 142. Stage 530 may itself include a plurality of stages. The plurality of stages may comprise the modification of lock structure 14 or of execution information in process table 120. For example, stage 530 generally includes stages 540, 550, and 560. In stage 540, the system checks process table 120 for a process 110 including a pointer to the identified lock structure 142. When such a process is found, its state is set to executable in stage 550. In stage 560, the lock count in lock structure 142 is decremented. After stage 530 is complete, the system returns to stage 520.

The combination of a spinlock and a lock value may be used to ensure exclusive access to a set of instructions and/or a set of registers. Some embodiments of the method of FIG. 5 may require the system to acquire a lock before reading either the lock structure itself or information protected by the lock. A method that requires a system to acquire a lock before reading associated information may be advantageous because it ensures that the information does not change while the system is reading it. Some embodiments of the method of FIG. 5 may require the system to acquire a lock before modifying either the lock structure itself or information protected by the lock.

Figure 6:
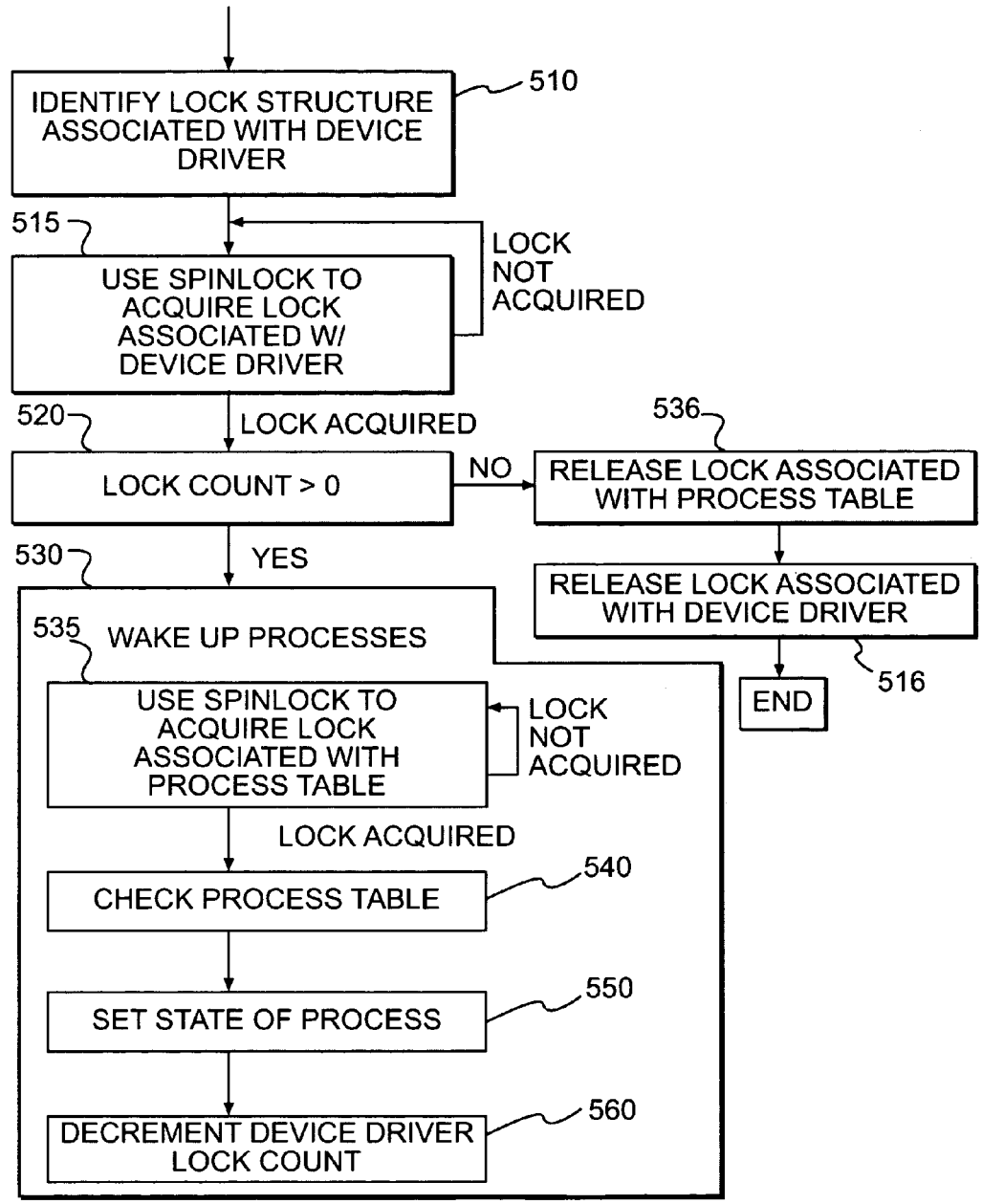
FIG. 6 illustrates another exemplary method for enabling access to a device driver when the device is ready, consistent with features and principles of the present invention.

FIG. 6 illustrates another exemplary method for enabling access to a device driver when the device is ready. The method of FIG. 6 is similar to the method of FIG. 5 except that lock structures are acquired, typically by the interrupt handler, before modifying lock structure 142 or process table 120.

In particular, in stage 515 of FIG. 6, a spinlock is used to acquire lock structure 142 associated with device driver 140 prior to decrementing the lock count in stage 560. If the lock value of lock structure 142 is a first value, lock structure 142 is acquired, the lock value is set to another value, and the wake up function proceeds to stage 520. Otherwise, the wake up function returns to stage 515 to again try to acquire lock structure 142.

Similarly, in stage 535 of FIG. 6, a spinlock is used to acquire lock structure 122 associated with process table 120 prior to modifying any execution information 112 in process table 120 as in stage 550. If the lock value of lock structure 122 is a first value, lock structure 122 is acquired, the lock value is set to another value, and the wake up function proceeds to stage 540. Otherwise, the wake up function returns to stage 535 to again try to acquire lock structure 122.

In stage 520 of FIG. 6, the wake up function checks the lock count in lock structure 142. If the lock count is not greater than zero, the wake up function is complete and the system proceeds to stages 536 and 516 in which the locks are released.

The methods of FIG. 3 and FIG. 6 can work together to overcome the problem of missed wake up calls. The method of FIG. 3 requires process 110 to acquire lock structure 142 associated with device driver 140 and not release lock structure 142 until either the process 110 is done with the device or the process has been set to wait for lock structure 142. The method of FIG. 6 requires an interrupt handler, for example, to acquire lock structure 142 associated with device driver 140 before waking up any process waiting for lock structure 142 and to release lock structure 142 after waking up all processes waiting for lock structure 142. Accordingly, since lock structure 142 may only be acquired by one operation at a time, the associated wake up function cannot occur while a process is being set to wait for lock structure 142.

One of ordinary skill in the art will appreciate that features and principles of the present invention may be implemented in a computer-readable medium (e.g., floppy disk, CD-ROM, storage device, etc.) containing instructions for a system, such as system 100, to execute the instructions.

The embodiments and aspects of the invention set forth above are only exemplary and explanatory. They are not restrictive of the invention as claimed. Other embodiments consistent with features and principles are included in the scope of the present invention.

In the foregoing description, various features are grouped together for purposes of streamlining the disclosure. This method of disclosure is not to be interpreted as reflecting an intention that the claimed invention requires more features than are expressly recited in each claim. Rather, as the following sample claims reflect, inventive aspects may lie in fewer than all features of a single foregoing disclosed embodiment. Thus, the following claims are hereby incorporated into this description, with each claim standing on its own as a separate embodiment of the invention.

What is claimed is:

1. A method for controlling a process's access to a device driver, comprising:
    using a spinlock to acquire a lock associated with the device driver, wherein the lock comprises a spinlock value representing the availability of the lock and a lock count representing a number of processes waiting for the device driver; and wherein,
        if the spinlock value is a first value, the lock is acquired and the spinlock value is set to a second value;
        if the spinlock value is not the first value, returning to the step of using the spinlock to acquire the lock associated with the device driver;
    after acquiring the lock, accessing the device driver; and
    if a device associated with the device driver is not ready, waiting for the lock, wherein waiting for the lock comprises:
        setting a field of the process to a pointer to the lock, wherein the field of the process is included in a process table that includes execution information of the process including a state of the process, and wherein access by the process to the device driver requires use of the process table;
        setting the state of the process to waiting, wherein the field of the process indicates when the process ends the waiting state according to the lock count;
        incrementing the lock count; and
        setting the spinlock value to the first value after the state of the process has been set to waiting, wherein the spinlock value is set to the first value independent of whether the waiting state of the process has ended; and
    if the device is ready, setting the spinlock value to the first value,
    wherein the lock is acquired using the spinlock before a checking of the lock count.

2. The method of claim 1, wherein incrementing the lock count is performed prior to setting the spinlock value to the first value.

3. The method of claim 1 further comprising, prior to setting the field of the process to the pointer to the lock, using a spinlock to acquire a second lock associated with the process table,
    wherein the second lock comprises a second spinlock value representing the availability of the second lock; and
    wherein if the second spinlock value is a third value, the second lock is acquired and the second spinlock value is set to a fourth value; and
    if the second spinlock value is not the third value, returning to the step of using the spinlock to acquire the second lock associated with the process table.

4. A method for enabling access by a process to a device driver, comprising:
    identifying a lock associated with the device driver, wherein the lock comprises a spinlock value representing the availability of the lock and a lock count representing a number of processes waiting for the device driver;
    using a spinlock to acquire the lock associated with the device driver, wherein, if the spinlock value is a first value, the lock is acquired and the spinlock value is set to a second value; and wherein if the spinlock value is not the first value, returning to the step of using the spinlock to acquire the lock associated with the device driver;
    waiting for the lock, wherein waiting for the lock comprises:
        setting a field of the process to a pointer to the lock, wherein the field of the process is included in a process table that includes execution information of the process including a state of the process, and wherein access by the process to the device driver requires use of the process table;
        setting a state of the process to waiting, wherein the field of the process indicates when the process ends the waiting state according to the lock count; and
    setting the spinlock value to the first value after the state of the process has been set to waiting, wherein the spinlock value is set to the first value independent of whether the waiting state of the process has ended;
    checking the lock count; and
    if the lock count is greater than zero,
        checking the process table for the process including the pointer to the lock;
        setting the state of the process to executable; and decrementing the lock count,
  wherein the lock is acquired using the spinlock before checking the lock count.

5. The method of claim 4 further comprising, if the lock count is greater than zero and no process in the process table includes the pointer to the lock, saving reporting information.

6. The method of claim 4 wherein, if the lock count is not greater than zero, checking the lock count further comprises setting the spinlock value to the first value.

7. The method of claim 4 further comprising, prior to setting the state for the process to executable, using a spinlock to acquire a second lock associated with the process table,
  wherein the second lock comprises a second spinlock value representing the availability of the second lock; and
  wherein, if the second spinlock value is a first value, the second lock is acquired and the second spinlock value is set to a second value; and if the second spinlock value is not the first value, returning to the step of using the spinlock to acquire the second lock associated with the process table.

8. A multithreaded processing system that controls access by a process to a device driver, comprising:
  memory; and
  at least one processor coupled to the memory, wherein the at least one processor is configured to perform a method comprising:
  using a spinlock to acquire a lock associated with the device driver, wherein the lock comprises a spinlock value representing the availability of the lock and a lock count representing a number of processes waiting for the device driver; and wherein,
  if the spinlock value is a first value, the lock is acquired and the spinlock value is set to a second value;
  if the spinlock value is not the first value, returning to the step of using the spinlock to acquire the lock associated with the device driver;
  accessing the device driver; and
  if the device is not ready, waiting for the lock, wherein waiting for the lock comprises:
  setting a field of the process to a pointer to the lock, wherein the field of the process is included in a process table that includes execution information of the process including a state of the process, and wherein access by the process to the device driver requires use of the process table;
  setting a state of the process to waiting, wherein the field of the process indicates when the process ends the waiting state according to the lock count;
  incrementing the lock count; and
  setting the spinlock value to the first value after the state of the process has been set to waiting, wherein the spinlock value is set to the first value independent of whether the waiting state of the process has ended; and
  if the device is ready, setting the spinlock value to the first value,
  wherein the lock is acquired using the spinlock before a checking of the lock count.

9. The system of claim 8 wherein the at least one processor is further configured to perform a method further comprising, prior to setting the field of the process to the pointer to the lock, using a spinlock to acquire a second lock associated with the process table,
  wherein the second lock comprises a second spinlock value representing the availability of the second lock; and
  wherein, if the second spinlock value is the third value, the second lock is acquired and the second spinlock value is set to a fourth value; and if the second spinlock value is not the third value, returning to the step of using the spinlock to acquire the second lock associated with the process table.

10. The system of claim 8, wherein incrementing the lock count is performed prior to setting the spinlock value to the first value.

11. The system of claim 10 wherein the at least one processor is further configured to perform a method comprising:
  identifying the lock associated with the device driver;
  checking the lock count; and
  if the lock count is greater than zero,
    checking the process table for the process including the pointer to the lock;
    setting the state for the process to executable;
    decrementing the lock count; and
    returning to the step of checking the lock count.

12. The system of claim 11 wherein the method further comprises, if the lock count is greater than zero and no process in the process table includes the pointer to the lock, saving reporting information in memory.

13. The system of claim 11, wherein, if the lock count is not greater than zero, checking the lock count further comprises setting the spinlock value to the first value.

14. The system of claim 11 wherein the method further comprises, prior to setting the state for the process to executable, using a spinlock to acquire a second lock associated with the process table,
  wherein the second lock comprises a second spinlock value representing the availability of the second lock;
  wherein, if the second spinlock value is a first value, the second lock is acquired and the second spinlock value is set to a second value; and if the second spinlock value is not the first value, returning to the step of using the spinlock to acquire the second lock associated with the process table.

15. The system of claim 8 wherein the at least one processor is a plurality of symmetric processors.

* * * * *